US011604712B2

(12) United States Patent
Guo et al.

(10) Patent No.: US 11,604,712 B2
(45) Date of Patent: *Mar. 14, 2023

(54) ACTIVE-ACTIVE ARCHITECTURE FOR DISTRIBUTED ISCSI TARGET IN HYPER-CONVERGED STORAGE

(71) Applicant: VMware, Inc., Palo Alto, CA (US)

(72) Inventors: Zhaohui Guo, Shanghai (CN); Yang Yang, Shanghai (CN); Haitao Zhou, Shanghai (CN); Jian Zhao, Shanghai (CN); Zhou Huang, Shanghai (CN); Jin Feng, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/284,482

(22) PCT Filed: Nov. 16, 2018

(86) PCT No.: PCT/CN2018/115837
§ 371 (c)(1),
(2) Date: Apr. 12, 2021

(87) PCT Pub. No.: WO2020/097902
PCT Pub. Date: May 22, 2020

(65) Prior Publication Data
US 2021/0357126 A1 Nov. 18, 2021

(51) Int. Cl.
G06F 11/20 (2006.01)
G06F 9/455 (2018.01)
(Continued)

(52) U.S. Cl.
CPC ........ G06F 11/2017 (2013.01); G06F 3/0604 (2013.01); G06F 3/067 (2013.01);
(Continued)

(58) Field of Classification Search
CPC .. G06F 11/2017; G06F 3/0604; G06F 3/0631; G06F 3/067; G06F 9/45558
See application file for complete search history.

(56) References Cited

U.S. PATENT DOCUMENTS 6,757,753 B1  6/2004  DeKoning et al.
6,915,354 B1  7/2005  Ozdemir et al.
(Continued)

FOREIGN PATENT DOCUMENTS

CN  102611754 A  7/2012
CN  105530306 A  4/2016
(Continued)

OTHER PUBLICATIONS

Extended European Search Report, application No. 18940248.0 (PCT/CN2018/115837), dated Mar. 24, 2022.
(Continued)

Primary Examiner — Edward J Dudek, Jr.
(74) Attorney, Agent, or Firm — Su IP Consulting

(57) ABSTRACT

A method is provided for a hyper-converged storage-compute system to implement an active-active failover architecture for providing Internet Small Computer System Interface (iSCSI) target service. The method intelligently selects multiple hosts to become storage nodes that process iSCSI input/output (I/O) for a target. The method further enables iSCSI persistent reservation (PR) to handle iSCSI I/Os from multiple initiators.

21 Claims, 11 Drawing Sheets

(51) Int. Cl.
*G06F 11/14* (2006.01)
*G06F 11/16* (2006.01)
*G06F 13/42* (2006.01)
*G06F 3/06* (2006.01)

(52) U.S. Cl.
CPC ........ *G06F 3/0631* (2013.01); *G06F 9/45558* (2013.01); *G06F 11/142* (2013.01); *G06F 11/165* (2013.01); *G06F 11/1616* (2013.01); *G06F 11/2002* (2013.01); *G06F 11/2023* (2013.01); *G06F 13/4234* (2013.01); *G06F 2009/45579* (2013.01); *G06F 2009/45583* (2013.01); *G06F 2009/45595* (2013.01); *G06F 2201/85* (2013.01); *G06F 2213/0036* (2013.01)

(56) References Cited

U.S. PATENT DOCUMENTS

| | | | |
|---|---|---|---|
| 7,325,097 | B1 | 1/2008 | Darcy |
| 7,460,473 | B1 | 12/2008 | Kodama et al. |
| 7,464,222 | B2 | 12/2008 | Matsunami et al. |
| 7,519,769 | B1 | 4/2009 | Kulkarni et al. |
| 7,664,883 | B2 | 2/2010 | Craft et al. |
| 7,698,424 | B1 | 4/2010 | Clark et al. |
| 7,730,221 | B2 | 6/2010 | Diamant et al. |
| 7,843,907 | B1 | 11/2010 | Abou-Emara et al. |
| 7,843,931 | B1 | 11/2010 | Anker et al. |
| 7,870,317 | B2 | 1/2011 | Suresh |
| 7,873,700 | B2 | 1/2011 | Pawlowski et al. |
| 7,990,994 | B1 | 8/2011 | Yeh et al. |
| 7,991,783 | B2 | 8/2011 | Flynn, Jr. et al. |
| 8,127,093 | B2 | 2/2012 | Asano et al. |
| 8,504,693 | B2 | 8/2013 | Khosravi et al. |
| 8,863,124 | B1 | 10/2014 | Aron |
| 8,976,704 | B2 | 3/2015 | Morper |
| 9,069,783 | B1 * | 6/2015 | Bono ................... G06F 3/0689 |
| 9,116,624 | B2 | 8/2015 | Canepa et al. |
| 9,830,082 | B1 | 11/2017 | Srinivasan et al. |
| 9,946,569 | B1 | 4/2018 | Beedu et al. |
| 10,148,751 | B1 * | 12/2018 | Natanzon ............. G06F 11/202 |
| 10,747,635 | B1 * | 8/2020 | Trachtman .......... G06F 11/0793 |
| 10,783,045 | B2 * | 9/2020 | Guo ........................ G06F 3/067 |
| 2003/0084209 | A1 | 5/2003 | Chadalapaka |
| 2003/0115447 | A1 | 6/2003 | Pham et al. |
| 2003/0177174 | A1 | 9/2003 | Allen et al. |
| 2004/0143640 | A1 | 7/2004 | Rangan et al. |
| 2004/0260768 | A1 | 12/2004 | Mizuno |
| 2005/0091333 | A1 | 4/2005 | Kobayashi et al. |
| 2005/0144404 | A1 | 6/2005 | Nashimoto et al. |
| 2005/0210144 | A1 | 9/2005 | Kumagai et al. |
| 2006/0020664 | A1 | 1/2006 | Umeda |
| 2010/0030910 | A1 | 2/2010 | Pong |
| 2010/0036932 | A1 | 2/2010 | Ogata et al. |
| 2010/0077391 | A1 * | 3/2010 | Domsch ............... G06F 9/45558 718/1 |
| 2010/0153975 | A1 | 6/2010 | Zwisler et al. |
| 2010/0161843 | A1 | 6/2010 | Spry |
| 2011/0246734 | A1 | 10/2011 | Umbehocker |
| 2012/0303810 | A1 | 11/2012 | Kotha et al. |
| 2013/0007741 | A1 | 1/2013 | Britsch et al. |
| 2013/0198424 | A1 | 8/2013 | Randhawa et al. |
| 2014/0289463 | A1 | 9/2014 | Carl |
| 2015/0117199 | A1 | 4/2015 | Chinnaiah Sankaran et al. |
| 2015/0172104 | A1 | 6/2015 | Brandwine |
| 2016/0203219 | A1 | 7/2016 | Hoch et al. |
| 2016/0357692 | A1 | 12/2016 | Lu et al. |
| 2016/0359955 | A1 | 12/2016 | Gill et al. |
| 2017/0155691 | A1 * | 6/2017 | Knauft ................ H04L 65/1069 |
| 2018/0136957 | A1 | 5/2018 | Guo et al. |
| 2020/0028894 | A1 * | 1/2020 | Memon ................. G06F 3/0605 |

FOREIGN PATENT DOCUMENTS

| | | |
|---|---|---|
| CN | 105892943 A | 8/2016 |
| WO | 2011069664 A1 | 6/2011 |

OTHER PUBLICATIONS

"ISCSI (Internet Small Computer System Interface)", Searchstorage.com, http://searchstorage.techtarget.com/definition/iSCSI, Oct. 20, 2014, 3 pages.

Jonghoon (Jason) Jeong, "iSCSI SAN Topologies", EMC2 Techbooks, EMC Corporation, http://www.emc com/collateral/hardware/technical-documentation/h8080-iscsi-san-topologies.pdf, Copyright 2011-2015, 192 pages.

"NetApp iSCSI Features/Benefits", NetApp, http://www.netapp.com/us/products/protocols/iscsi/features.aspx, January 2106 [retrieved Feb. 1, 2017], 3 pages.

Steven Poitras, "The Nutanix Bible", nutanixbible.com, Copyright 2016, 164 pages.

Scale Computing, "Scale Computing Storage Cluster User Guide", https://scalecomputing.com/files/documentation/userguide-2.3.3.pdf, Jan. 2016 [retrieved Feb. 1, 2017], 116 pages, San Mateo, CA.

Hans De Leenheer et al, "Deep Dive on SimpliVity's OmniStack", http://www.nu.co.za/images/SimpliVity/Whitepapers/omnicube_technical_deep_dive.pdf, Aug. 2013, 10 pages.

Brian Suhr, "Hyper-Converged Infrastructure comparison, Nutanix vs SimpliVity vs EVO:RAIL", www.datacenterzombie.com, Oct. 2014, 11 pages.

J. Satran et al, "Internet Small Computer Systems Interface (iSCSI)", www.ietf.org/rfc/rfc3720.txt, Apr. 2004, 222 pages.

George Penokie, Information Technology-SCSI Architecture Model—4 (SAM-4), INCITS, Nov. 21, 2007, 149 pages.

Ralph O. Weber, Information Technology—SCSI Primary Commands—4 (SPC-4), INCITS, Jul. 29, 2008, 740 pages.

Lee Duncan, "A Tutoria on SCSI-3 Persistent Group Reservations", SUSE Labs, Dec. 2012, 11 pages.

Edward Tomasz Napierala, "Native iSCSI target", FreeBSD Handbook, May 17, 2014, 1 page.

FreeBSD, "28.12. iSCSI Initiator and Target Configuration", FreeBSD Handbook, Jan. 2016 [retreived Mar. 21, 2017], 5 pages.

Microsoft, "Multipath I/O Overview", Microsoft TechNet, Jun. 2015 [retrieved Mar. 21, 2017], 6 pages.

Jens Axboe, "FIO", Free(code), Jun. 2014, 1 page.

International Search Report and Written Opinion of the International Searching Authority, International application No. PCT/CN2018/115837, dated Aug. 6, 2019.

\* cited by examiner

ACTIVE-ACTIVE ARCHITECTURE FOR DISTRIBUTED ISCSI TARGET IN HYPER-CONVERGED STORAGE

CROSS-REFERENCE TO RELATED APPLICATIONS

The present application is a 371 application of International Application PCT/CN2018/115837, filed Nov. 16, 2018 and entitled "ACTIVE-ACTIVE ARCHITECTURE FOR DISTRIBUTED ISCSI TARGET IN HYPER-CONVERGED STORAGE." The International application. The present application is also related to U.S. patent application Ser. No. 15/350,027, filed Nov. 12, 2016, which is commonly owned and incorporated by reference.

BACKGROUND

VMware vSphere is suite of virtualization software for implementing and managing virtual infrastructures. The software includes (1) ESXi hypervisor that implements virtual machines (VMs) on physical hosts, (2) virtual storage area network (vSAN) that aggregates local storage to form a shared datastore for a cluster of ESXi hosts, and (3) vCenter Server that centrally provisions and manages virtual datacenters, VMs, ESXi hosts, clusters, datastores, and virtual networks. The vSAN software may be implemented as part of the ESXi hypervisor software.

The vSAN software uses the concept of a disk group as a container for solid-state drives (SSDs) and non-SSDs, such as hard disk drives (HDDs). On each host (node) in a vSAN cluster, the local drives are organized into one or more disk groups. Each disk group includes one SSD that serves as read cache and write buffer (e.g., a cache tier), and one or more SSDs or non-SSDs that serve as permanent storage (e.g., a capacity tier). The aggregate of the disk groups from all the nodes form a vSAN datastore distributed and shared across the nodes.

The vSAN software stores and manages data in the form of data containers called objects. An object is a logical volume that has its data and metadata distributed across a vSAN cluster. For example, every virtual machine disk (VMDK) is an object, as is every snapshot. For namespace objects, the vSAN software leverages virtual machine file system (VMFS) as the file system to store files within the namespace objects. A virtual machine (VM) is provisioned on a vSAN datastore as a VM home namespace object, which stores metadata files of the VM including descriptor files for the VM's VMDKs.

vSAN introduces a converged storage-compute platform where VMs are running on ESXi hosts as usual while a small percentage of CPU and memory resources is used to serve the storage needs of the same VMs. vSAN enables administrators to specify storage attributes, such as capacity, performance, and availability, in the form of simple policies on a per-VM basis. vSAN offers many advantages over traditional storage, including scalability, simplicity, and lower total cost of ownership.

Internet small computer system interface (iSCSI) is a transport layer protocol that describes how small computer system interface (SCSI) packets are transported over a transmission control protocol/Internet protocol (TCP/IP) network. By using standard Ethernet, iSCSI is cheaper to adopt and easier to manage because it does not require expensive and sometimes complex switches and cards that are needed to run Fibre Channel (FC) networks. In recent years, the transport speed of iSCSI has become comparable to FC. As a result, iSCSI has gained popularity such that most platforms that use block devices support the iSCSI protocol.

vSAN iSCSI target (VIT) service allows hosts and physical workloads that reside outside a vSAN cluster to access a vSAN datastore. VIT service enables an iSCSI initiator on a remote host to transport block-level data to an iSCSI target on a storage device in the vSAN cluster. After enabling and configuring VIT service on the vSAN cluster, a user can discover iSCSI targets from the remote host using the Internet protocol (IP) address of any ESXi host in the vSAN cluster and the TCP port of the iSCSI targets. To ensure high availability of the iSCSI targets, the user may use the IP addresses of two or more ESXi hosts to configure multipath support for his or her iSCSI application.

DETAILED DESCRIPTION

Figure 1:
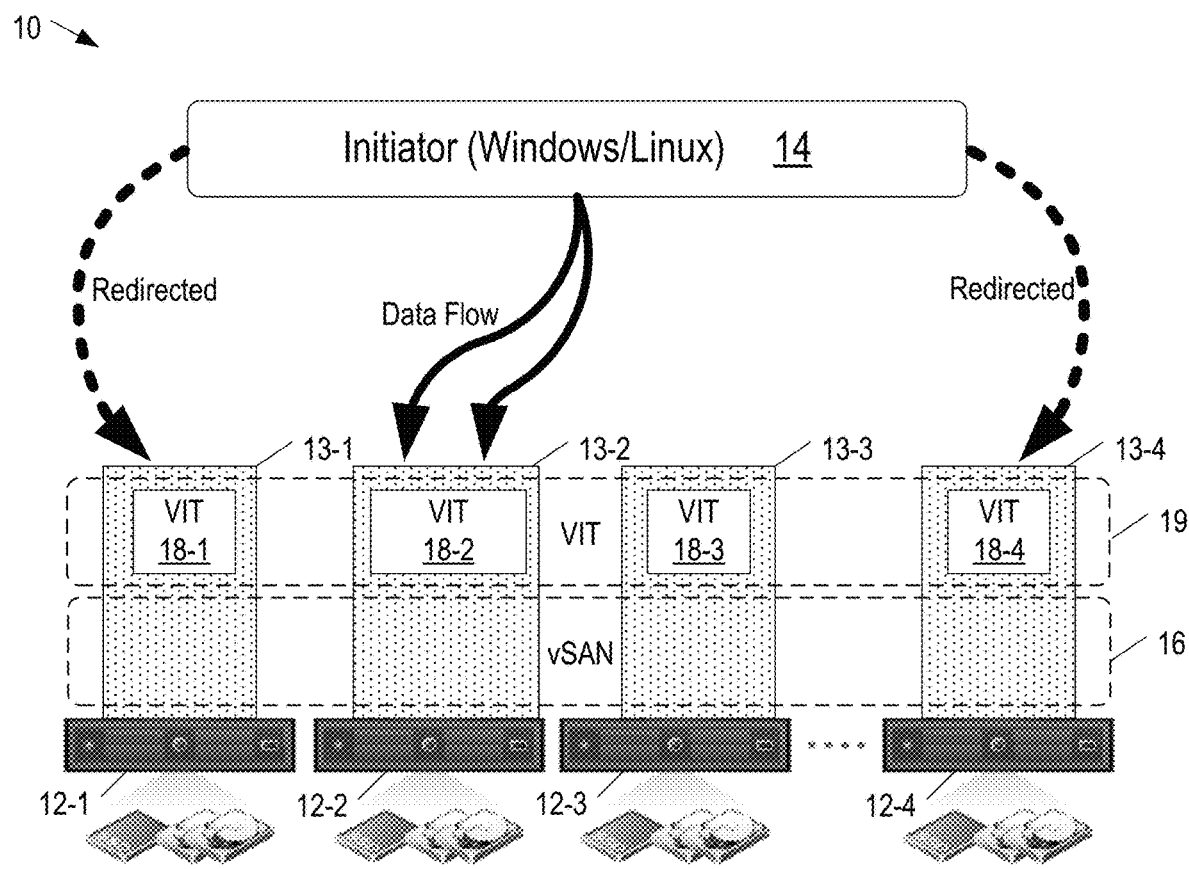
FIG. 1 is a block diagram illustrating a hyper-converged, distributed storage system having an active-passive (AP) failover architecture for VIT service.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Virtual storage area network (vSAN) iSCSI target service encompasses four basic concepts: (1) target, (2) logical unit number (LUN), (3) discovery node (DN), and (4) storage node (SN).

A target is a container for LUNs. It is the unit for authentication and authorization as well as failover. An initiator connects to a target and then accesses the LUNs in the target. A target is implemented as a namespace object created by the vSAN software from storage in the vSAN datastore.

A LUN is a block device that can be consumed by the initiator. A LUN is implemented as a virtual machine disk (VMDK) created by the vSAN software from the vSAN datastore as described in co-pending U.S. patent application Ser. No. 15/350,027 filed Nov. 12, 2016, which is commonly owned and incorporated by reference.

A DN is an ESXi host that can act as a discovery portal for iSCSI service that an initiator may access to discover available targets.

A SN is an ESXi host that can process iSCSI input/outputs (I/Os) to the LUNs within a target.

FIG. 1 is a block diagram illustrating a hyper-converged, distributed storage system 10 having an active-passive (AP) failover architecture for vSAN iSCSI target (VIT) service. System 10 includes a cluster of ESXi hosts 12-1, 12-2, 12-3, and 12-4 (collectively as "ESXi hosts 12" or individually as a generic "ESXi host 12"). ESXi hosts 12-1, 12-2, 12-3, and 12-4 run respective ESXi hypervisors 13-1, 13-2, 13-3, and 13-4, which have vSAN modules (not shown) that implement a vSAN layer 16 to create a vSAN datastore (not shown). ESXi hypervisors 13-1, 13-2, 13-3, and 13-4 also have respective VIT modules 18-1, 18-2, 18-3, and 18-4 that implement a VIT layer 19 to create iSCSI targets (not shown) from the vSAN datastore.

In the active-passive (AP) failover architecture for the current VIT service, each target is owned by a single ESXi host 12 (more specifically its hypervisor 13 or VIT software component), and every ESXi host 12 acts as a discovery portal for iSCSI service. The target owner is responsible for opening all the VMDKs in its target and providing access to LUNs backed by the VMDKs. If an iSCSI initiator 14 attempts to connect to a non-owner host for a target, the non-owner would redirect initiator 14 to the target owner via iSCSI redirect. For example, when initiator 14 attempts to connect to ESXi hosts 12-1 and 12-4 for the target owned by ESXi host 12-2, ESXi hosts 12-1 and 12-4 redirect initiator 14 to ESXi host 12-2. Even if initiator 14 attempts to use multipathing to create multiple connections to both the target owner and one or more of the non-owners, the non-owners would redirect initiator 14 to the target owner via iSCSI redirect.

When a target owner fails, vSAN layer 16 selects a new target owner. A target owner fails when the host loses power, crashes, reboots, or loses network connectivity. At any given time, there is only a single active ESXi host 12 for a target, and the other ESXi hosts 12 serve as backup. In summary, every ESXi host 12 is a DN for every target, and there is only a single SN for a target. System 10 is described in greater detail in co-pending U.S. patent application Ser. No. 15/350, 027 filed Nov. 12, 2016, which is commonly owned and incorporated by reference.

One drawback of the AP failover architecture for the current VIT service is its failover time. When failover occurs, a new target owner takes several seconds to open all the VMDKs backing the LUNs in a target and initialize the states for all the LUNs. The failover time is broken down to four main parts.

First is the delay for the vSAN layer to detect an ESXi host's "liveness" that indicates if the host is connected to the other ESXi hosts in a vSAN cluster. The vSAN layer detects host liveness every 7 seconds so this delay could be anywhere from 0 to 7 seconds.

Second is the 16-second virtual machine file system (VMFS) lock timeout. VMFS provides a distributed lock mechanism that restricts access to a file shared by EXSi hosts. An "exclusive" lock prevents multiple ESXi hosts from concurrently writing a file and corrupting metadata. If an ESXi host holding an exclusive lock on a file does not renew the lock within the 16-second timeout, another ESXi host may break the lock and place its own lock on the file. The heartbeat region of a VMFS volume is used for this on-disk locking, and every host that uses the VMFS volume has its own heartbeat region. This region is updated by the host on every heartbeat (e.g., 3 seconds). The region that is updated is the time stamp, which tells others that this host is alive. When the host is down, this region is used to communicate lock state to other hosts.

VIT service leverages the VMFS lock mechanism to coordinate opening and writing LUNs. To open and write a LUN, a target owner acquires the exclusive lock on a descriptor file of the LUN in a target namespace object, wherein the descriptor file has the vSAN universal unique identifier (UUID) of a VMDK object backing the LUN. When the target owner dies suddenly, a new target owner must wait at least 16 seconds for the prior target owner's heartbeat, which is established per target (VMFS volume), to time out before the new target owner may open the VMDK object backing the LUN. When several targets fail together, the recovery process must wait for the VMFS heartbeat of each target to time out. While the timeouts may occur in parallel, the overall wait time still increases when the number of targets rises.

Third is the time for a new target owner to open a LUN (VMDK) after establishing its VMFS heartbeat. Fourth is the time for a new target owner to initialize a LUN (VMDK) for input/output (I/O) processing. While both these times are short, the overall wait still increases when the number of LUNs (VMDKs) increases.

Another drawback of the AP failover architecture for the current VIT service is its performance. The iSCSI protocol stack on a target owner becomes a bottleneck when there are many LUNs (e.g., 100 LUNs) in a target because a single target owner processes all I/Os to the LUNs in that target. The network bandwidth of the target owner also forms a bottleneck.

Figure 2:
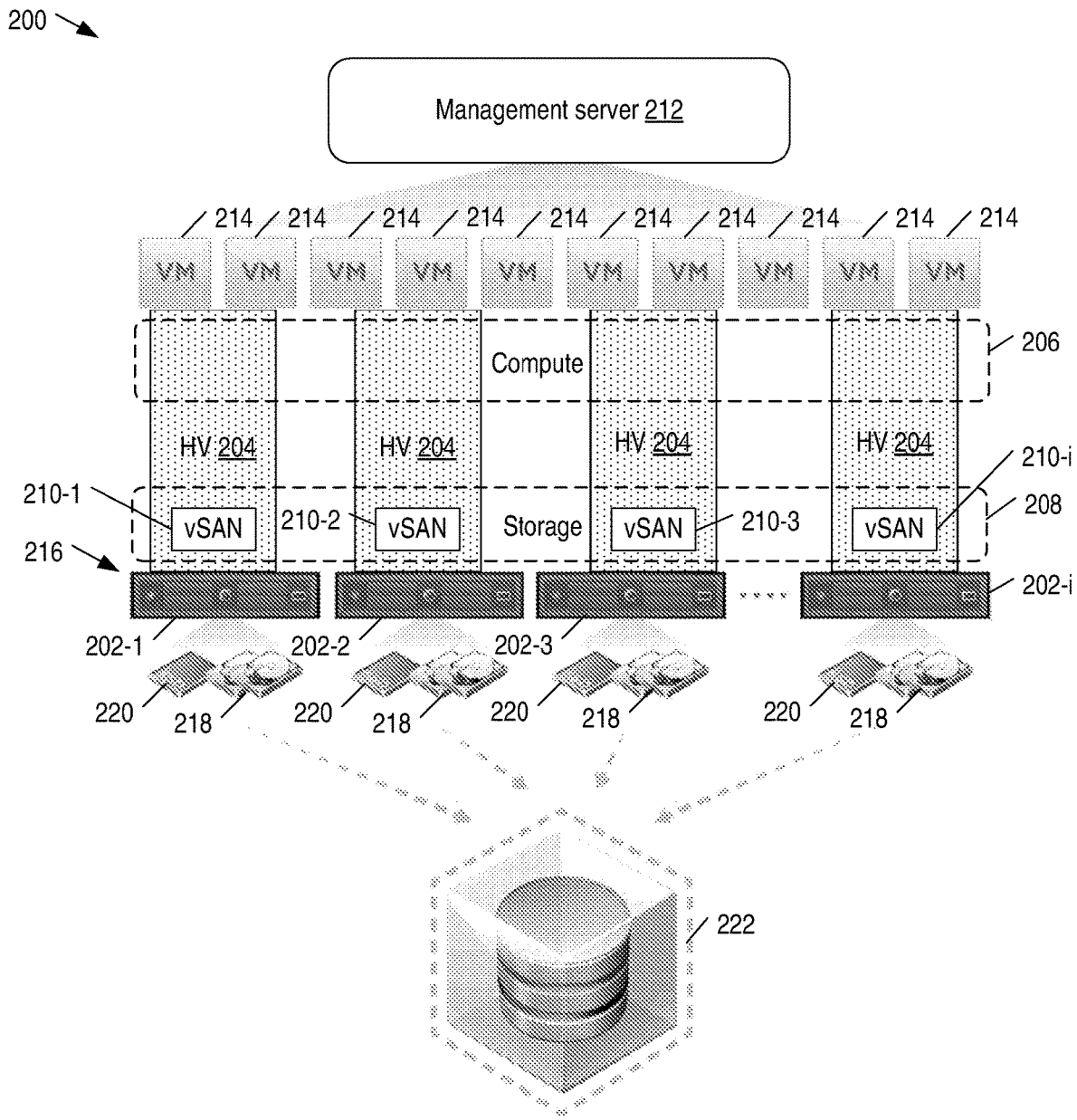
FIG. 2 is a block diagram illustrating a hyper-converged, distributed storage system in some examples of the present disclosure.

FIG. 2 is a block diagram illustrating a simplified view of hyper-converged, distributed storage system 200 in some examples of the present disclosure. System 200 includes host computers 202-1, 202-2, 202-3, . . . 202-i (collectively as "hosts 202" or individually as a generic "host 202") running respective (e.g., ESXi) hypervisors 204-1, 204-2, 204-3, and 204-4 (collectively as "hypervisors 204" or individually as a generic "hypervisor 204") to provide a hyper-converged compute layer 206 and a hyper-converged, distributed storage (e.g., vSAN) layer 208. Hypervisors 204-1, 204-2, 204-3, and 204-4 include respective hyper-converged, distributed storage (e.g., vSAN) modules 210-1, 210-2, 210-3, and 210-4 (collectively as "vSAN modules 210" or individually as a generic "vSAN module 210") that implement vSAN layer 208. A management (e.g., vCenter) server 212 centrally provisions and manages (1) VMs 214 on the hyper-converged compute layer 206 and (2) a hyper-converged distributed (e.g., vSAN) datastore 222 on vSAN layer 208. Hosts 202 make up nodes of a hyper-converged, distributed storage (e.g., vSAN) cluster 216. Nodes 202 contribute local storage resources (e.g., non-SSDs 218 and SSD 220) to form vSAN datastore 222.

Figure 3:
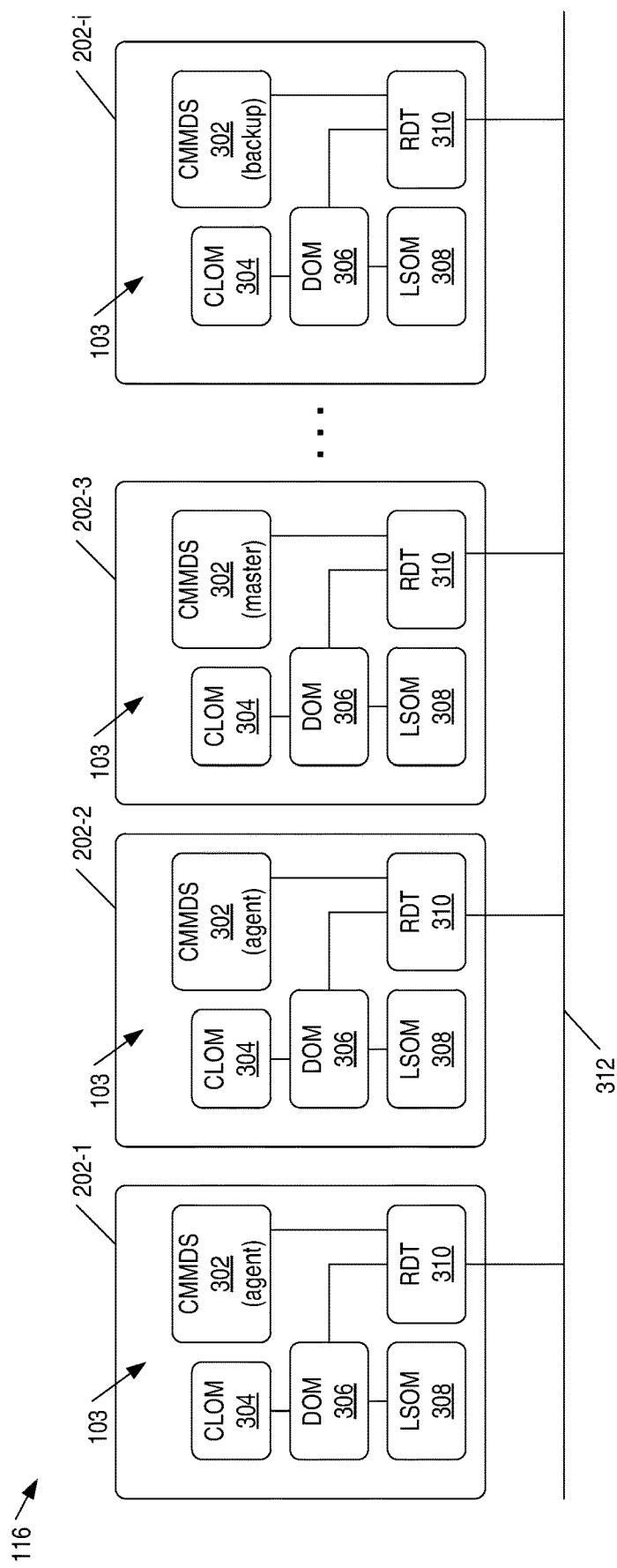
FIG. 3 is a block diagram illustrating distributed storage modules of hypervisors in the system of FIG. 2 in some examples of the present disclosure.

FIG. 3 is a block diagram illustrating vSAN modules 210 in some examples of the present disclosure. Each vSAN module 210 includes the following components: cluster monitoring membership and directory services (CMMDS) 302, cluster level object manager (CLOM) 304, distributed object manager (DOM) 306, local log structured object management (LSOM) 308, and reliable datagram transport (RDT) 310. CLOM 304 validates resource availability and ensure objects are placed in vSAN cluster 216 in a way that satisfy their storage policies, and DOM 306 creates components and applies configuration locally through LSOM 308. DOM 306 also coordinates with its counterparts for component creation on other nodes 202 in vSAN cluster 216. All subsequent reads and writes to objects funnel through DOM 306, which will forward them to the appropriate components. RDT 310 is the communication mechanism for VMDK input/output (I/O) in a network 312 between nodes 202. It uses transmission control protocol (TCP) at the transport layer and it is responsible for creating and destroying TCP connections (sockets) on demand.

Each object has a unique owner DOM 306 at any given time. The owner DOM 306 is responsible for monitoring the storage policy compliance for the object. In case the owner DOM 306 detects a component for the object fails, it would wait for a specified time (e.g., 60 minutes), and then it asks CLOM 304 to re-configure the object according to its storage policy. CLOM 304 would tell owner DOM 306 where to place the new component if re-configuration is needed. Owner DOM 306 would create a new component and resync the data to the new component. If owner DOM 306 dies, the other DOMs 306 would leverage CMMDS to elect a new owner DOM for the objects of the failed DOM.

CMMDS 302 is responsible for monitoring the vSAN cluster's membership, checking heartbeats between nodes 202, and publishing updates to the cluster directory. Other software components use the cluster directory to learn of changes in cluster topology and object configuration. For example, DOM 306 uses the contents of the cluster directory to determine nodes 202 storing the components of an object and the paths by which those hosts 202 are reachable.

To handle failures, each host 202 plays one of three roles in the VSAN cluster: master, agent or backup. Roles are applied during a cluster discovery when all hosts 202 participating in the VSAN cluster elect a master. The master node is responsible for getting clustering service updates from other nodes and distributing these updates to the other nodes through its connections with the other nodes. The clustering service updates include changes to object and component ownership, such as when a prior owner of an object dies and a new owner is selected. The backup node assumes the master role when the master node fails. The agent nodes may change roles when both the master and the backup node fail. Each agent node accepts local cluster service updates, such as changes to object and component ownership, and forwards them to the master node for distribution to the other nodes. It also accepts updates from the master node and applies them to the local copy of the cluster directory.

Figure 4:
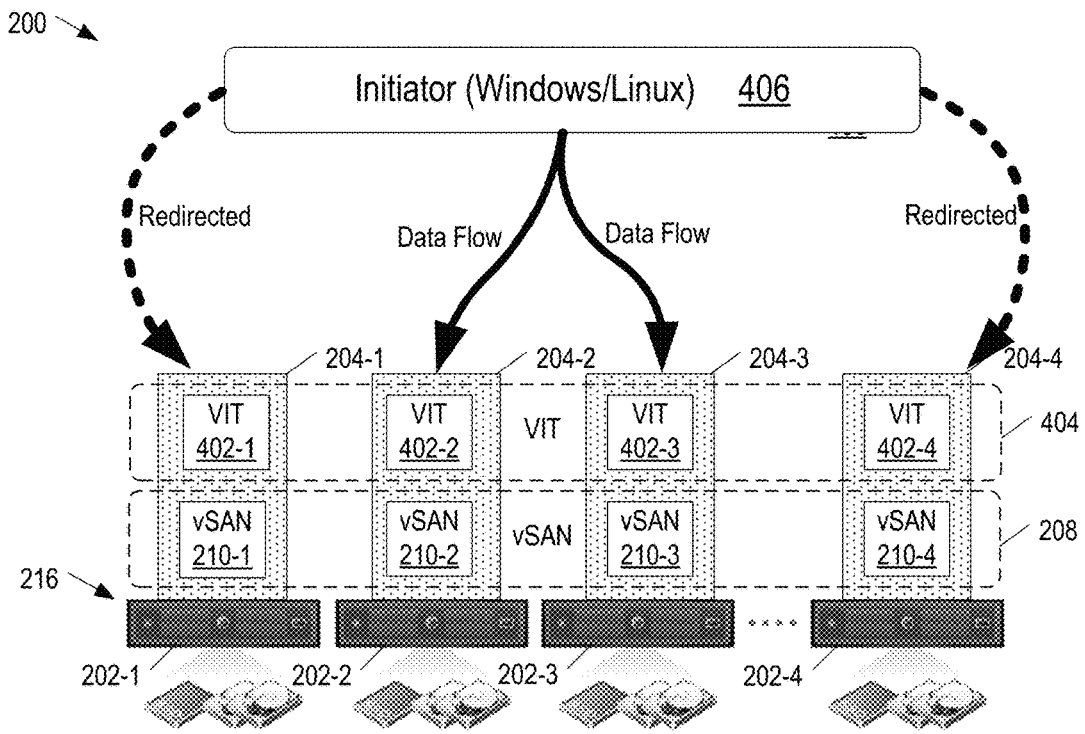
FIG. 4 is a block diagram illustrating the system of FIG. 2 having an active-active (AA) failover architecture for VIT service in some examples of the present disclosure.

FIG. 4 is a block diagram illustrating system 200 having an active-active (AA) architecture for VIT service in some examples of the present disclosure. Hypervisors 204-1, 204-2, 204-3, and 204-4 include respective vSAN modules 210-1, 210-2, 210-3, and 210-4 that implement vSAN layer 208. Hypervisors 204-1, 204-2, 204-3, and 204-4 also include respective iSCSI target (e.g., VIT) modules 402-1, 402-2, 402-3, and 402-4 (collectively as "VIT modules 402" or individually as a generic "VIT module 402") that implement an iSCSI target (e.g., VIT) layer 404.

In the AA architecture, instead of a single target owner serving iSCSI I/Os for a target, multiple hosts simultaneously serve iSCSI I/Os for a target. For example, hosts 202-2 and 202-3 concurrently serve iSCSI I/Os for a target (not shown). In other words, a target has multiple SNs. Each host 202 acts as a DN for every target. If an iSCSI initiator 406 attempts to connect to a target through a non-SN of the target, the non-SN would randomly or sequentially (e.g., one after another) select one of the SNs of the target and redirect initiator 406 to the selected SN via iSCSI redirect. For example, when initiator 406 attempts to connect to hosts 202-1 and 202-4 (via multipathing) for the target served by hosts 202-2 and 202-3, hosts 202-1 and 202-4 randomly select and redirect initiator 406 to hosts 202-2 and 202-3, respectively. To evenly distribute the initiator's connections among the SNs for the target, any SN that receives a redirect may determine heuristically to further redirect the initiator based on the number of connections it has for an <initiator, target> pair or its own workload. For example, each SN can be configured to only support one or a few connections for an <initiator, target> pair so that the SN would randomly select and redirect the initiator to another SN when the threshold is exceeded.

To take advantage of multiple SNs for a target, an initiator utilizes multipathing to send I/Os through the SNs to the target. System 200 does not need to be concerned about the order of the I/Os arriving at a target because multipathing does not guarantee the order of the I/Os from different paths. To guarantee data consistency in system 200, vSAN layer 208 (more specifically CMMDS 302 and DOM 306 in hosts 202) ensures that writes to one host 202 are immediately visible to the other hosts 202 so each host 202 knows if it may use the data in its or if it must retrieve the data from another host 202 (e.g., DOM 306 does not use local cache when multi-writer is enabled).

A cluster of initiators may access the same LUN in a target. To ensure data consistency, initiators in a cluster may use SCSI persistent reservations (PR). Thus, as described later, system 200 supports SCSI PR.

VMFS provides a multi-writer mechanism that allows multiple VMs to open and write a VMFS-backed virtual disk (e.g., VMDK) by setting a multi-writer flag for the VMDK. The same mechanism allows multiple hosts to open and write to the same LUN backed by a VMDK. In theory, each host 202 may open all the LUNs in a distributed (e.g., vSAN) datastore and act as a SN for all the LUNs in every target so no iSCSI redirect is needed. However, this approach suffers from scalability issues. If a host 202 opens all the LUNs in every target, it would consume memory for all the LUNs even if no initiator accesses the LUNs through this host 202. If the number of LUNs increases, every host 202 would consume more resources. The total number of targets supported by a cluster would be limited to the total number of targets supported by the hosts individually. Furthermore, this approach offers no method to balance iSCSI initiators to different hosts 202. Thus, there is a need for a method to intelligently select SNs for a target.

In examples of the present disclosure, the number of SNs for a target is selected to satisfy the number of host and device failures to tolerate (FTT) for the target and its LUN. In the context of a distributed storage system such as vSAN, failures to tolerate is defined as the number of vSAN nodes that could fail while still being able to provide access to all the data that is stored in vSAN. Thus, if the target has N number of FTT, then the number of SNs for the target would be at least N+1 to guarantee fault tolerance for VIT service.

VIT layer 404 creates a namespace object for every target, and vSAN layer 208 creates components for the target namespace object and places them among hosts 202 in the cluster according to the target's FTT and failure tolerance method. In some examples of the present disclosure, any host 202 that owns a component of a target namespace object becomes a SN for that target.

As component placement is used for selecting SNs for each target, RAID-1 is used as the failure tolerance method for all the targets so their component placement has a fixed pattern. Furthermore, a target's FTT is adjusted automatically according to the maximum FTT of the LUNs in the target. For example, if a target's FTT is set to one (1), then it would have two duplicate components and two hosts would become SNs for the target. When a target's FTT increases, the number of components as well as the number of SNs increase. For example, if a target's FTT is increased to two (2), then it would have three duplicate components and three hosts would become SNs for the target.

Figure 5:
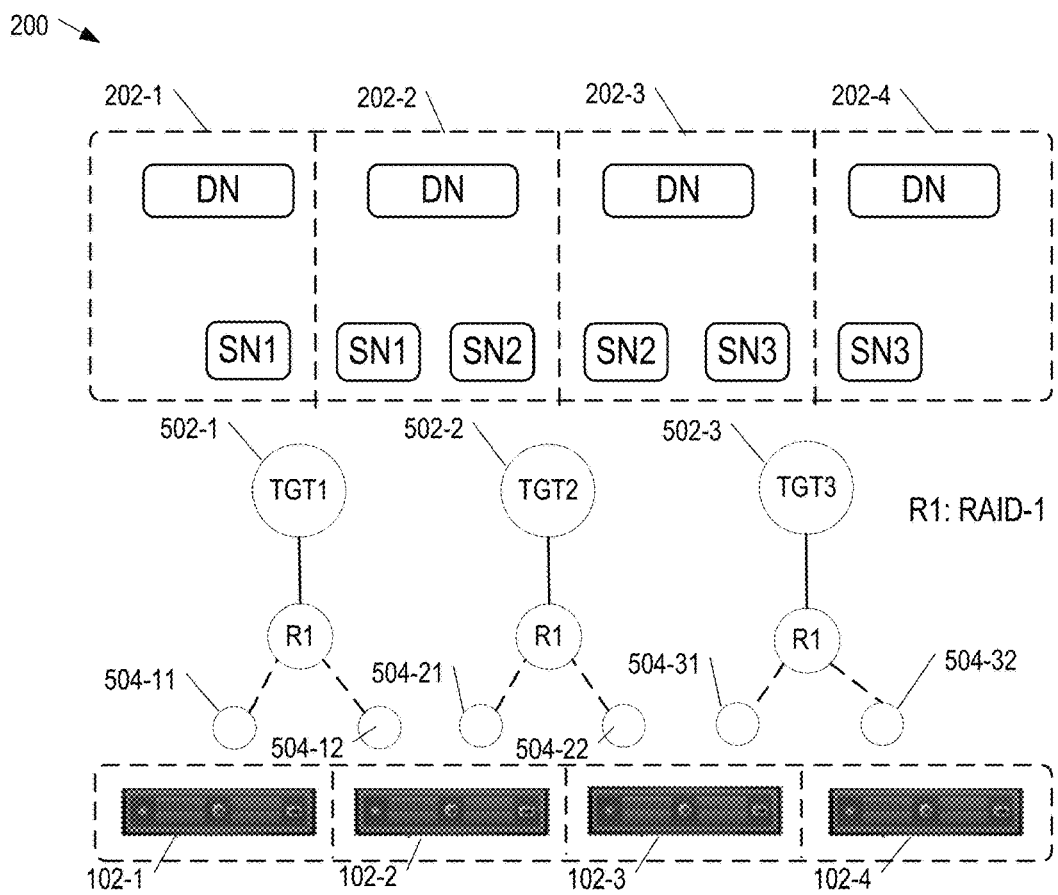
FIG. 5 is a block diagram illustrating the placement of discovery nodes and storage nodes on hosts in relation to the component locations of target namespace objects in the system of FIG. 2 in some examples of the present disclosure.

FIG. 5 is a block diagram illustrating the placement of DNs and SNs on hosts 202 in relation to the component locations of target namespace objects in system 200 in some examples of the present disclosure. System 200 is shown with three targets 502-1, 502-2, and 502-3 (collectively as "targets 502" or individually as a generic "target 502"). When targets 502 have a FTT of one (1) and use RAID-1 as the failure tolerance method, each target 502 would have two (2) duplicate components stored on two different hosts 202. For example, target 502-1 has duplicate components 504-11 and 504-12 stored on hosts 202-1 and 202-2, respectively, target 502-2 has duplicate components 504-21 and 504-22 stored on hosts 202-2 and 202-3, respectively, and target 502-3 has duplicate components 504-31 and 503-32 stored on hosts 202-3 and 202-4, respectively. From the component placement of targets 502, host 202-1 becomes a SN (SN1) for target 502-1, host 202-2 becomes a SN (SN1) for target 502-1 and a SN (SN2) for target 502-2, host 202-3 becomes a SN (SN2) for target 502-2 and a SN (SN3) for 502-3, and host 202-4 becomes a SN (SN3) for target 502-3.

VIT module 402 (FIGS. 4, 6, 7) on each host 202 can query and monitor the component placement information from CMMDS 302 (FIG. 3) and determine if host 202 is a SN for a target. When a host 202 becomes a component owner of a target namespace object for a target, the host 202 becomes a SN for the target and requests "multi-writer" locks on the LUNs in the target (more specifically the descriptor files of the LUNs in the target namespace object) to read and write them. Unlike the exclusive lock, the VMFS distributed lock mechanism allows multiple hosts 202 to obtain the multi-writer lock on a file so they may read and write the same file. When the host 202 loses ownership of the component, the host 202 loses its roles as a SN for the target and closes all iSCSI connections with initiators and releases the lock on the LUNs in the target. If the initiator retries the iSCSI connection, the host 202 would redirect the initiator to one of the new SNs for the target.

In the AA architecture, each host is also a DN for all the targets in a vSAN cluster. When processing an iSCSI discovery command, a DN in the AA architecture returns the IP addresses of all the SNs for a target. This simplifies the configuration on the initiator side as the user only needs to configure a single discovery portal since each DN can respond with all the SNs for any target.

Even if a DN sends the IP addresses of all the SNs for a target to an initiator, the initiator may sometimes connect to a non-SN because the SNs for the target may occasionally change. In this case, the non-SN redirects the initiator to one of the new SNs for the target. The non-SN randomly or sequentially selects the redirected SN from the new SNs of the target. As previously described, the redirected SN may determine heuristically to further redirect the initiator based on the number of connections the redirected SN has for an <initiator, target> pair or its own workload.

When one SN fails, an initiator still has at least one different path to the target through another available SN for the target. While it may take a few seconds for vSAN layer 208 to resume the I/Os in a failover, the time is usually less than 10 seconds. Thus, failover time for iSCSI will be the same as that for vSAN alone as the iSCSI stack does not introduce any additional overhead during an AA failover.

Figure 6:
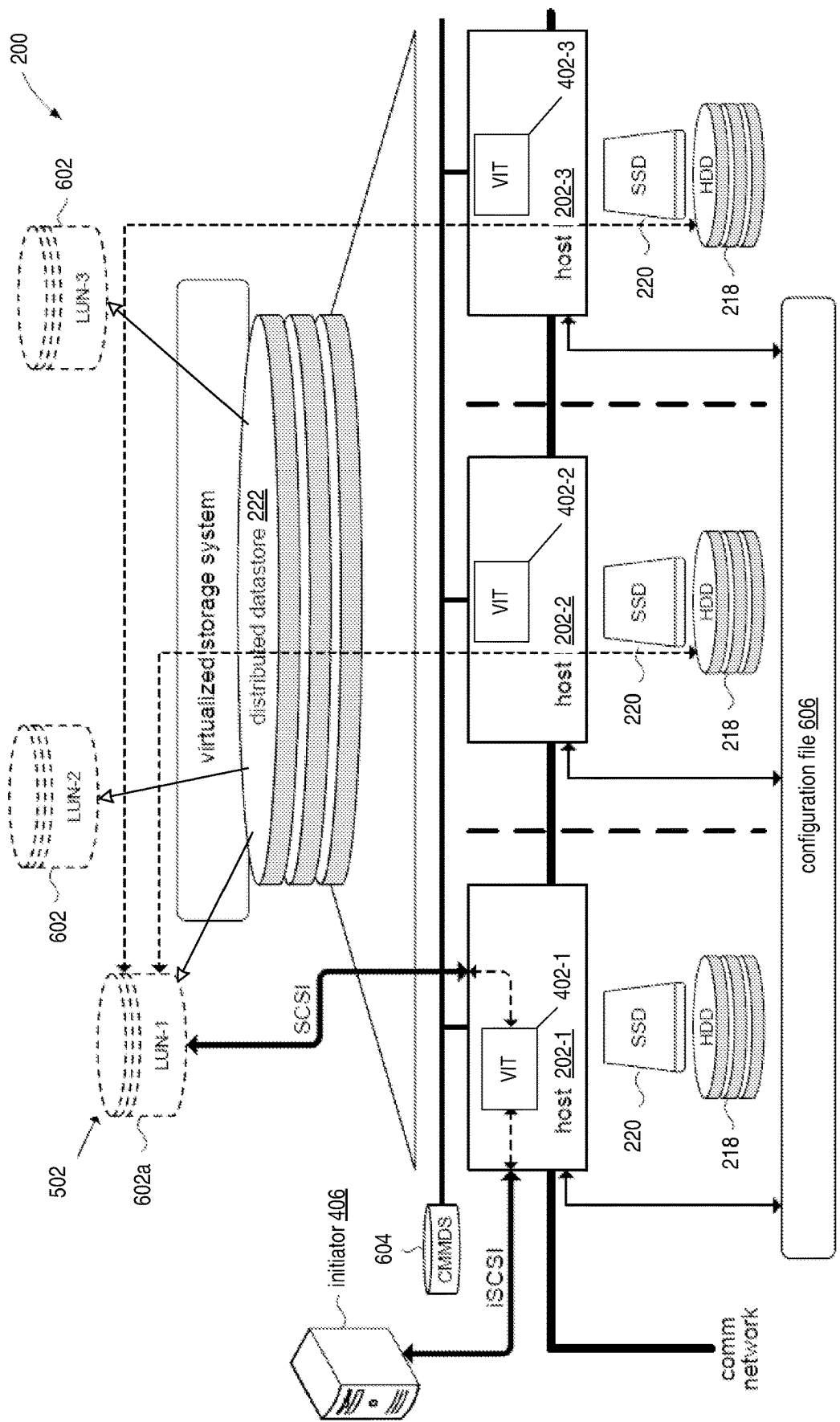
FIG. 6 is a block diagram illustrating additional details of the system in FIG. 2 in some examples of the present disclosure.

FIG. 6 is a block diagram illustrating additional details of system 200 in some examples of the present disclosure. Host 202-1 serves as a SN for a target containing a LUN 602a. LUN 602a is backed by a VMDK provisioned from storage in vSAN datastore 222, such as a local hard disk drive 218 of host machine 202-2 and a local hard disk drive 218 of host machine 202-3. Each host 202 includes a VIT module 402 for communicating with initiator 406. Hosts 202 uses CMMDS cluster directory 604 and configuration file 606 to communicate and store configuration data for supporting iSCSI targets in vSAN datastore 222.

Figure 7:
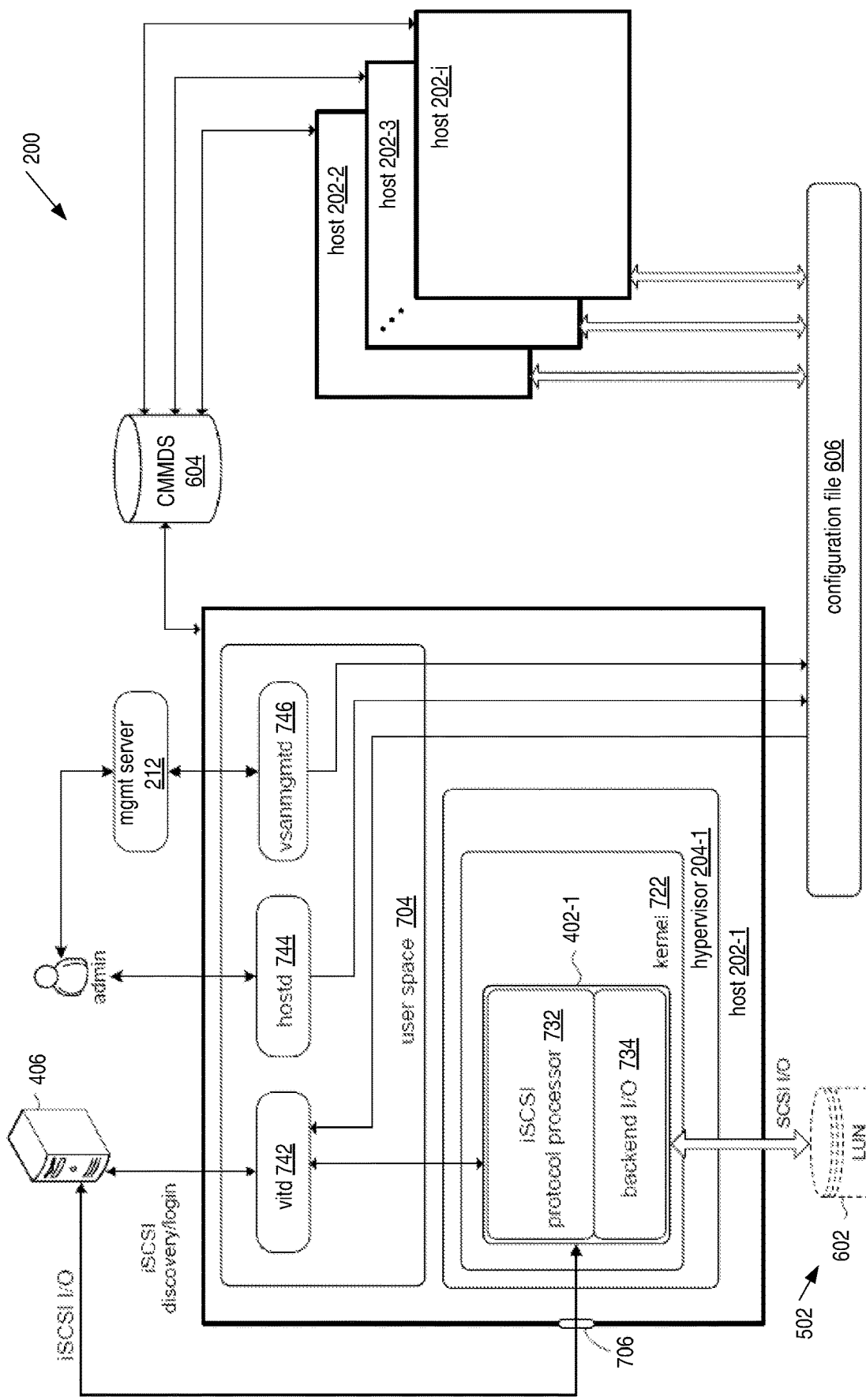
FIG. 7 is a block diagram illustrating additional details of a host in the system of FIG. 2 in some examples of the present disclosure

FIG. 7 is a block diagram illustrating additional details of a host 202-1 in some examples of the present disclosure. Host 202-1 includes hypervisor 204-1 having software components that implement vSAN layer 208 (FIGS. 4 and 5) and the hyper-converged compute layer 206 (FIG. 4). Hypervisor 204-1 includes a kernel 722 that mediates iSCSI I/O access with LUNs 602.

Kernel 722 includes VIT module 402-1 to process iSCSI protocols within hypervisor 204-1. VIT module 402-1 includes an iSCSI protocol processor module 732 to unpack an inbound iSCSI protocol packet and access a SCSI command encapsulated in the inbound iSCSI protocol packet. VIT module 402-1 also includes a backend I/O processing module 734 to access a LUN 602 identified in the inbound iSCSI protocol packet by using the file system commands and protocols of vSAN layer 208. Backend I/O processing module 734 may translate between iSCSI protocols and the file system commands and protocols of vSAN layer 208 to service iSCSI requests from initiator 406. As explained above, a LUN 602 consists of storage aggregated from local storage across several hosts 202. Via vSAN layer 208, backend I/O processing module 734 accesses those hosts 202 whose local storage make up an identified LUN 602.

Host 202-1 has an execution environment called a user space 704 within which various processes of host 202 can execute. For example, user space 704 includes a host daemon process (hostd) 744 and a management daemon process (vsanmgmtd) 706. Host daemon 744 allows a user (e.g., system administrator) to access host 202 directly. Host daemon 744 provides a command line interface to allow users to configure host 202-1. Management daemon 746 is a server that provides APIs for users to remotely manage host 202-1, such as over the Internet. In accordance with examples of the present disclosure, host daemon 744 and management daemon 746 facilitate the definition and configuration of LUNs 602 to be used as iSCSI targets and to store that information in configuration file 606.

User space 704 includes a target daemon process (vitd) 742. Target daemon 742 handles authentication (e.g., login processing), authorization, and target discovery processing pursuant to the iSCSI protocol for iSCSI initiators 406. Target daemon 742 may also monitors changes in and access to information relating to the configuration of iSCSI targets contained in configuration file 606, and to push that information to kernel 722. Target daemon 742 also interacts with CMMDS cluster directory 604 to monitor for changes in the configuration of iSCSI targets, and to push that information to kernel 722.

Host 202-1 includes a transmission control protocol/Internet protocol (TCP/IP) communication port 706 for communication in accordance with TCP/IP. Communication port 706 may be any suitable network interface (wired or wireless) that can provide a point-to-point connection over a TCP/IP network infrastructure.

Other hosts 202 are configured in the same or similar manner as host 202-1.

Figure 8:
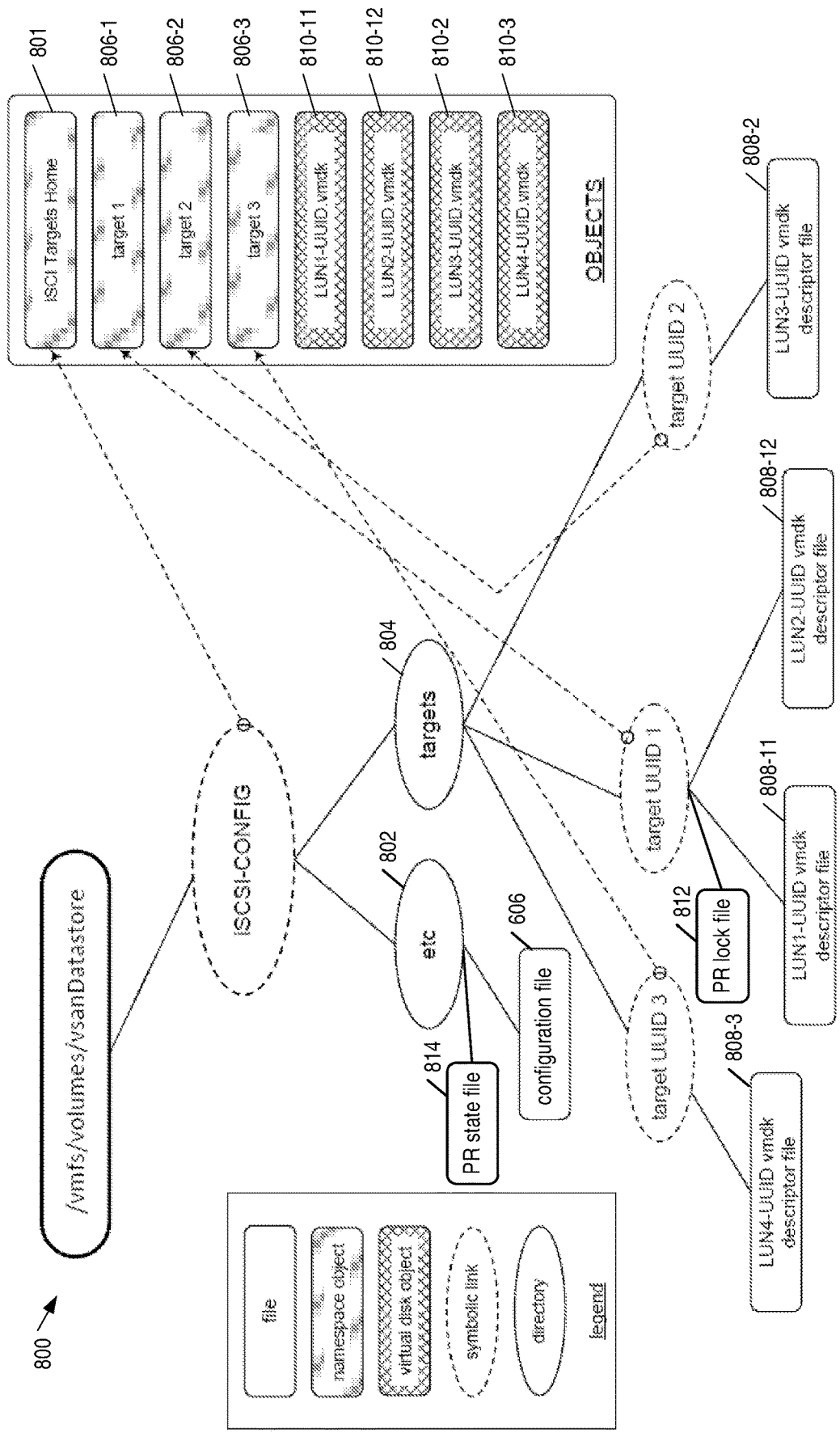
FIG. 8 is a block diagram illustrating a namespace to manage targets and LUNs in the system of FIG. 2 in some examples of the present disclosure.

FIG. 8 is a block diagram illustrating a namespace 800 to manage targets and LUNs in system 200 (FIGS. 4, 5, and 6) in some examples of the present disclosure. A namespace object 801 called "iSCSI Targets Home" contains a nested hierarchy of namespace objects for LUNs 602 that are configured as iSCSI targets. iSCSI Targets Home 801 includes (1) an "etc" directory 802 to hold configuration file 606 (FIGS. 5 and 6) and (2) a "targets" directory 804 to hold symbolic links to target namespace objects. Each target namespace object is associated with an iSCSI target and includes one or more descriptor files that contain information for one or more LUNs 602 (VMDKs) that constitute the iSCSI target. For example, (1) a target namespace object 806-1 identifies a "target 1" and includes descriptor files 808-11 and 808-12 identifying VMDK objects 810-11 and 810-12 called "LUN1-UUID.vmdk" and "LUN2-UUID.vmdk" that constitute target 1, respectively, (2) a target namespace object 806-2 identifies a "target 2" and includes a descriptor file 808-2 identifying a VMDK object 810-2 called "LUN3-UUID.vmdk" that constitutes target 2, and (3) a target namespace object 806-3 identifies a "target 3" and includes a descriptor file 808-3 identifying a VMDK object 810-3 called "LUN4-UUID.vmdk" that constitutes target 3. The objects may be related by symbolic links to create a hierarchical representation of the objects that make up the LUNs and the targets in distributed datastore 222 (FIGS. 4, 5, and 6).

Every host 202 can query cluster wide information from CMMDS cluster directory 604 (implemented with CMMDS agent 302 on each host 202), and every host 202 can also subscribe to changes for a query. When a host 202 updates configuration file 606, the host 202 automatically increments a "config generation number" and publishes it to CMMDS cluster directory 604, which notifies the other hosts 202 subscribed to receive the configuration generation number. When a host 202 receives the incremented config generation number, it reads the new configuration from configuration file 606, detects any difference between the prior configuration in its volatile memory and the new configuration in configuration file 606, and makes the appropriate changes. CMMDS cluster directory 604 includes a list of subscribed hosts 202 and the configuration generation number.

Figure 9:
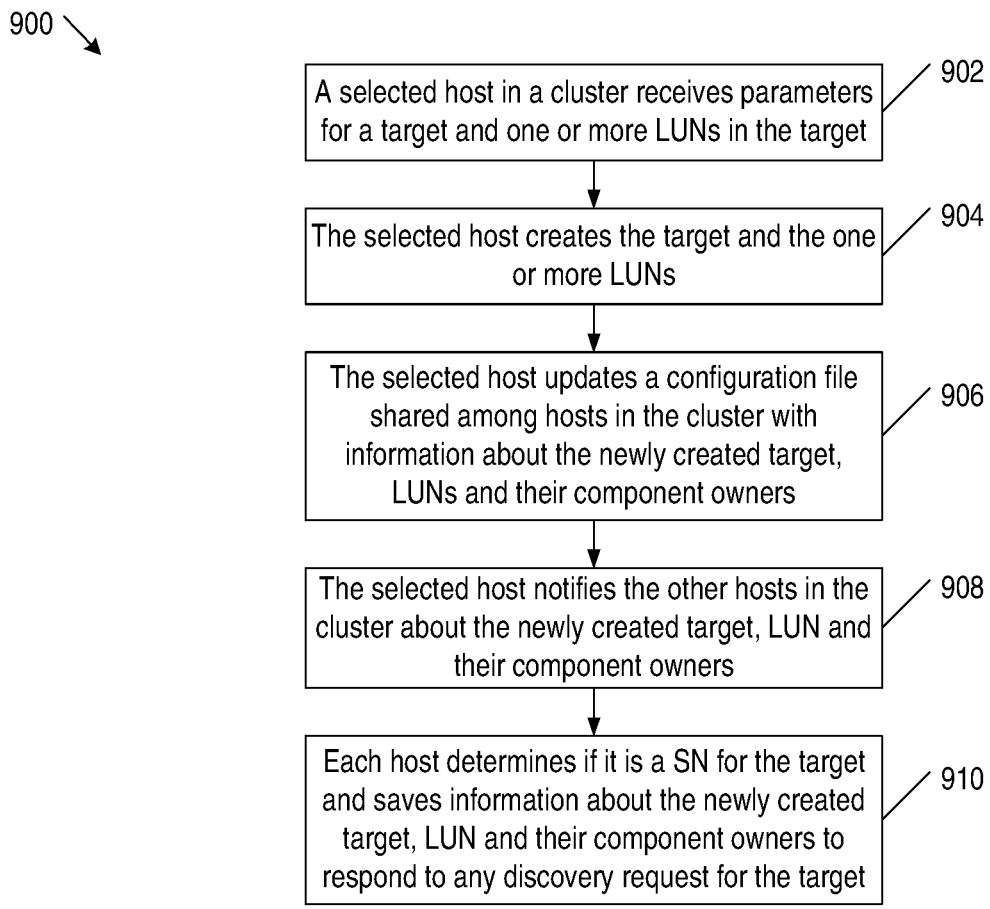
FIG. 9 is a block diagram illustrating a flowchart of a method for the system of FIG. 2 to implement AA failover architecture for VIT service in some examples of the present disclosure.

FIG. 9 is a block diagram illustrating a flowchart of a method 900 for system 200 to implement AA architecture for VIT service in some examples of the present disclosure. Method 900, and any method described herein, may be implemented as instructions encoded on a computer-readable medium that is to be executed by a processor in a computer system. Method 900, and any method described herein, may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 900 may begin in block 902.

In block 902, a selected host 202 in vSAN cluster 216 receives parameters for an iSCSI target 502 and one or more LUNs 602 in the target 502. Using vSphere client, vSphere web client, or command line interface (CLI), a user accesses vCenter server 212 to set the parameters of target 502 and LUNs 602. For target 502, the user may provide a target alias, a virtual network, a TCP port, an authentication method, and a storage policy (e.g., a number of FTT with RAID-1 preset as the failure tolerance method). For each LUN 602, the user may provide a LUN ID, a LUN alias, a storage policy (e.g., a number of FTT and a failure tolerance method), and a size. vCenter server 212 randomly, sequentially, or heuristically selects a host 202 from vSAN cluster 216 and instructs the selected host 202 to create target 502 and LUNs 602 with the parameters.

Instead of using vCenter server 212 to create target 502 and LUNs 602, the user may select a host 202 and use CLI to access the selected host 202 (via its host daemon 744) to set the parameters of target 502 and LUNs 602.

Block 902 may be followed by block 904.

In block 904, the selected host 202 creates target 502 and LUNs 602. vSAN module 210 on the selected host 202 creates a target namespace object for the target and VMDK objects for LUNs 602 in vSAN datastore 222, and publishes their component placement information through CMMDS cluster directory 604. For the target namespace object, vSAN module 210 creates duplicate components of the object and places them on different hosts 202 (component owners). VIT module 402 of the selected host 202 creates a symbolic link to the target namespace object in the targets directory 804 under the iSCSI Targets Home namespace object 801. For example, FIG. 8 shows a symbolic link called "target UUID 3" added to targets directory 804 to add an iSCSI target called "target 3" to the hierarchy of iSCSI targets in the iSCSI Targets Home namespace object 801.

For a VMDK object, vSAN module 210 of the selected host 202 creates components of the object and place them on different hosts 202 (component owners). VIT module 402 of the selected host 202 creates a VMDK descriptor file for the VMDK object in the target namespace object. The VMDK description file includes the UUID and the location of the VMDK object. For example, FIG. 8 shows a descriptor file 808-3 for the VMDK object 810-3 called "LUN4-UUID.vmdk" is in the target namespace object 806-3 called "target 3."

Block 904 may be followed by block 906.

In block 906, VIT module 402 of the selected host 202 updates configuration file 606 with information about the newly created target 502 and LUNs 602. The information includes identities of the newly created target 502 and LUNs 602, and their component owners (queried from CMMDS cluster directory 604). Block 906 may be followed by block 908.

In block 908, VIT module 402 of the selected host 202 notifies the other hosts 202 in vSAN cluster 216 about the newly created target 502, LUNs 602 and their component owners. VIT module 402 increments the config generation number and publishes it to CMMDS cluster directory 604, which notifies the other hosts 202 in vSAN cluster 216. After receiving the incremented config generation number, each of the other hosts 202 (more specifically its VIT module 402) reads the new configuration from configuration file 606 and learns of the newly created target 502, LUNs 602 and their component owners. Block 908 may be followed by block 910.

In block 910, VIT modules 402 of all the hosts 202 determine if they are component owners of the newly created target 502. When a host 202 is a component owner of the newly created target 502, that host 202 becomes a SN for target 502 and proceeds to obtain multi-writer locks on LUNs 602 (more specifically their descriptor files 808) in target 502 and open the VMDK objects backing the LUNs 602 in target 502. Any host 202 that is not a SN for the target does not need to save the identities of the SNs (component owners) as it can query such information from CMMDS cluster directory 604 when responding to any iSCSI discovery command for target 502.

Figure 10:
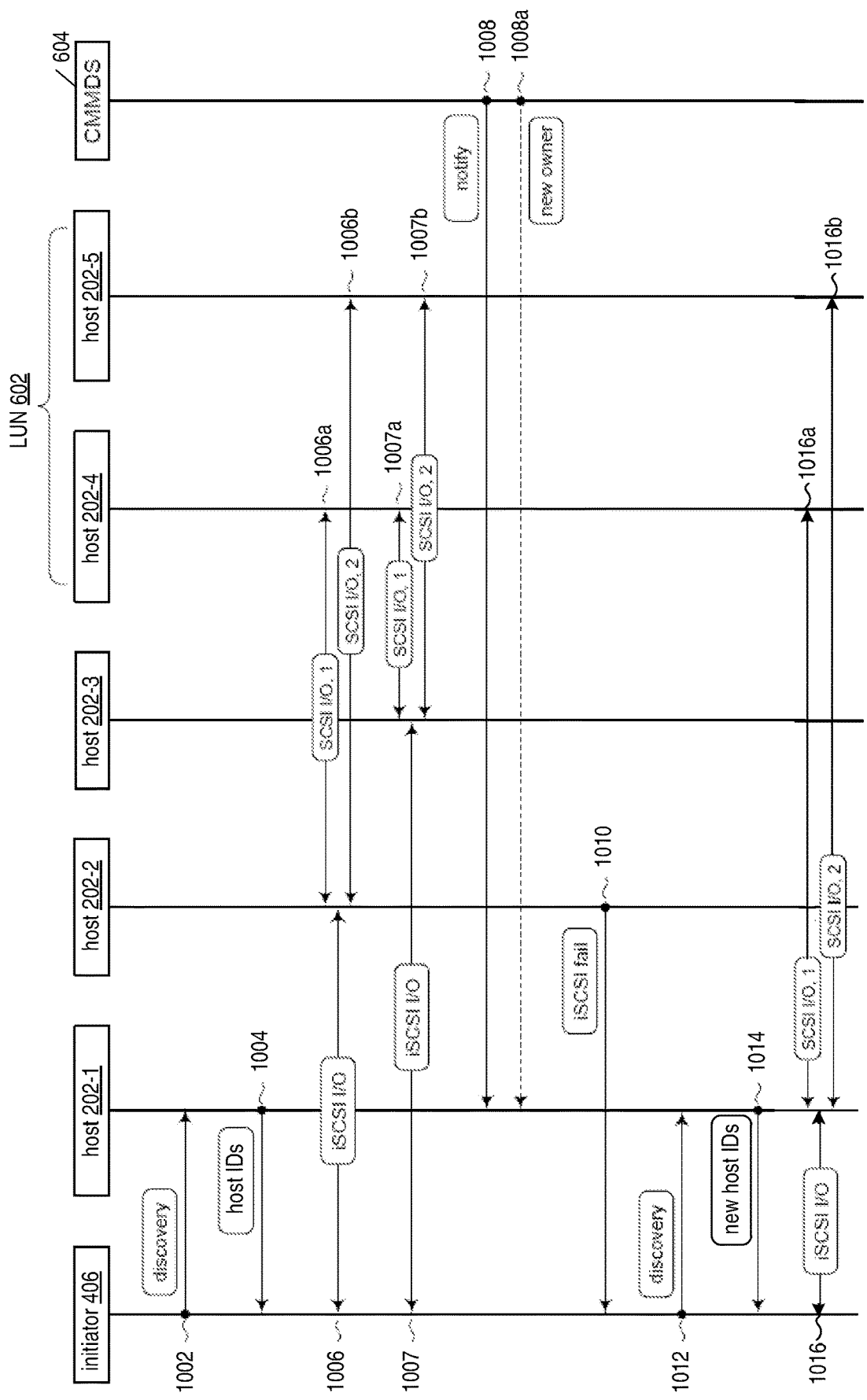
FIG. 10 is a block diagram illustrating an iSCSI communication sequence in the system of FIG. 2 in some examples of the present disclosure.

FIG. 10 is a block diagram illustrating an iSCSI communication sequence in system 200 in some examples of the present disclosure. FIG. 10 demonstrates multiple hosts 202 serving as SNs for the same LUN. At step 1002, initiator 406 initially performs a discovery operation with hosts 202-1 to conduct iSCSI I/Os with a given target 502. At step 1004, host 202-1 returns information that identifies hosts 202-2 and 202-3 as SNs for target 502. Steps 1006 and 1007 demonstrate multipathing through hosts 202-2 and 202-3. At step 1006, initiator 406 performs a login sequence with host 202-2 and then performs iSCSI I/Os to a given LUN 602. Initiator 406 may send a login request, which contains the identities of the initiator 406 and the requested target 502, authentication information, if required, and other parameters to be negotiated between the initiator 406 and the target 502. With the login process completed, a session is established for initiator 406 to read and write LUN 602 via host 202-2. At steps 1006a and 1006b, host 202-2 performs SCSI I/Os with other hosts 202 (e.g., hosts 202-4 and 202-5) whose hard disk drives 218 contain the VMDK backing LUN 602. At step 1007, initiator 406 performs a login sequence with host 202-3 and then performs iSCSI I/Os to the same LUN 602. With the login process completed, a session is established for initiator 406 to read and write LUN 602 via host 202-3. At steps 1007a and 1007b, host 202-3 performs SCSI I/Os with the other hosts 202 (e.g., hosts 202-4 and 202-5) whose hard disk drives 218 make up the VMDK backing LUN 602. Note the session with hosts 202-2 and 202-3 overlap as initiator 406 is accessing LUN 602 via both hosts.

vSAN layer 208 uses a quorum mechanism to determine if a host 202 is unreachable to the other hosts 102 in cluster 216. When a host 202 that also happens to be a SN for target 502 is unreachable after a specified time (e.g., 60 minutes), vSAN layer 208 creates a new duplicate component of the target namespace object of target 502 and places it on a different host, which becomes a new component owner and therefore a new SN for target 502. For example, when CMMDS 302 of the master node uses a quorum mechanism to determine a host 202 (e.g., host 202-2) that also happens to be a SN for target 502 is unreachable after a certain time, the owner DOM 306 of the target namespace object of target 502 creates a new duplicate component of the target namespace object and places it on a different host (e.g., host 202-1), which becomes a new component owner and therefore a new SN for target 502 previously owned by host 202-2. DOM 306 publishes the change to CMMDS cluster directory 604.

At step 1008, CMMDS 302 of the master node notifies hosts 202 in vSAN cluster 216 of a change in the component owners for the target. At step 1008a, each host 202 learn of the new component owner of target 502. For example, host 202-1 may learn it is the new component owner of target 502, become a SN for target 502, obtain multi-writer locks on LUNs 602 in target 502, and open the VMDK objects backing the LUNs 602 in target 502.

At step 1010, initiator 406 may experience the SN failure by timing out while conducting iSCSI I/Os with host 202-2. Note host 202-3 is unaffected by the outage of host 202-2 and continues to serve iSCSI I/Os to target 502. At step 1012, initiator 406 repeats the discovery operation with host 202-1 to identify the new SN. At step 1014, host 202-1 returns the identity of the new SN (e.g., host 202-1 itself or another host). At step 1016, initiator 406 performs a login sequence with host 202-1 and then performs iSCSI I/Os for LUN 602. With the login process completed, a session is established for initiator 406 to read and write LUN 602 via host 202-1 (or another host). At steps 1016a and 1016b, host 202-1 performs SCSI I/Os with the other hosts 202 (e.g., hosts 202-4 and 202-5) whose hard disk drives 218 make up the VMDK backing LUN 602. Note the session with hosts 202-1 and 202-3 overlap as initiator 406 is accessing LUN 602 via both hosts.

Figure 11:
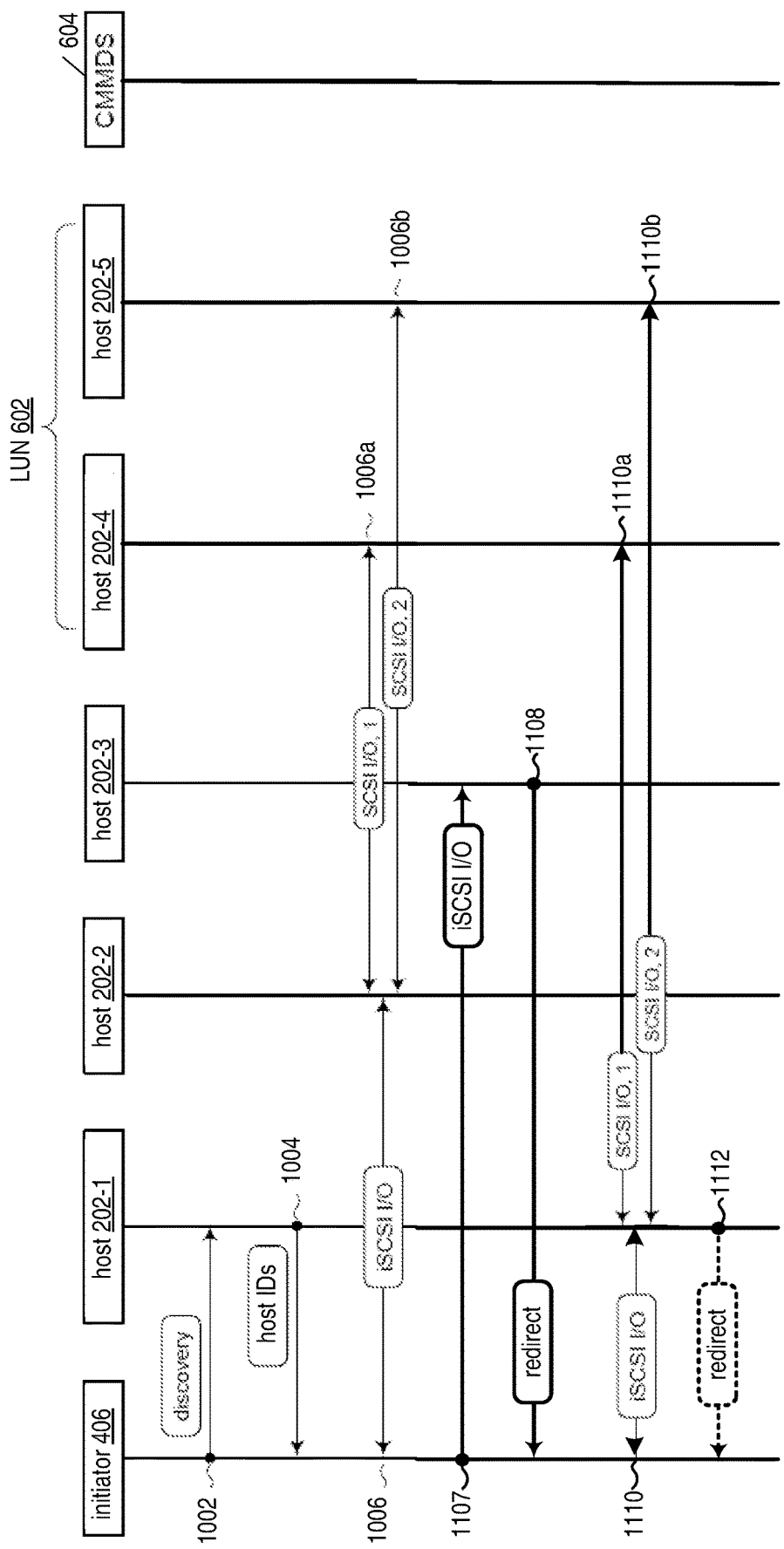
FIG. 11 is a block diagram illustrating a method for the system of FIG. 2 to process iSCSI persistent reservation (PR) requests in some examples of the present disclosure.

FIG. 11 is a block diagram illustrating an iSCSI communication sequence in system 200 in some examples of the present disclosure. FIG. 11 demonstrates a host 202 redirecting initiator 406 to a SN for a target when the host 202 is no longer one of the SNs for the target, and the redirected SN 202 optionally further redirecting the initiator 406 to another SN for the target. Steps 1002 to 1006 are the same as those described in FIG. 10.

In step 1107, initiator 406 sends a login request for target 502 to host 202-3. Assume host 202-3 is no longer a SN for the given target 502. At step 1108, host 202-3 randomly or sequentially selects one of the SNs of target 502 and redirect initiator 406 to the selected SN via iSCSI redirect. For example, host 202-3 randomly selects and redirects initiator 406 to hosts 202-1. The redirect is a message informing initiator 406 that target 502 has moved to a different address so that initiator 406 would reissue the login request to the new address.

At step 1110, initiator 406 performs a login sequence with host 202-1 and then performs iSCSI I/Os for LUN 602. With the login process completed, a session is established for initiator 406 to read and write LUN 602 via host 202-1 (or another host). At steps 1110a and 1110b, host 202-1 performs SCSI I/Os with the other hosts 202 (e.g., hosts 202-4 and 202-5) whose hard disk drives 218 make up the VMDK backing LUN 602. Note the session with hosts 202-1 and 202-3 overlap as initiator 406 is accessing LUN 602 via both hosts.

Instead of step 1110, host 202-1 may further determine heuristically to redirect initiator 406 based on the number of connections host 202-1 has for the <initiator, target> pair or its own workload. This is illustrated in optional step 1112, where host 202-1 randomly or sequentially selects one of the SNs of target 502 and redirect initiator 406 to the selected SN via iSCSI redirect.

In the AP architecture, there is a single target owner for each target so SCSI-3 PR requests are processed by one host. To support the failover, the PR state are persisted to (stored in) a PR file for each LUN so that the PR state can be reloaded when the target owner fails over.

In contrast to the AP failover architecture, with the AA architecture, all SNs are active for processing I/Os so any of them may receive PR requests. PR requests consist of SCSI persistence reservation out (PROUT) request that modifies PR state, and SCSI persistence reservation in (PRIN) request that reads the PR state. As PROUT request is rare because it is usually only issued by initiators when the membership of an initiator cluster changes. Thus, the performance impact of processing PROUT request may be ignored. However, I/O fencing requires checking the PR state for each I/O so every SN should fetch the PR state without significant delay.

In examples of the present disclosure, system 200 leverages CMMDS cluster directory 604 and VMFS distributed file lock to synchronize the PR states of LUNs 602 so a new intercommunication channel is not needed for PR processing. SNs for a target use the VMFS distribution file lock to determine which SN is to lead the processing of a PR request for the target, and the SNs use CMMDS cluster directory 605 to communicate parameters for processing the PR request.

Figure 12:
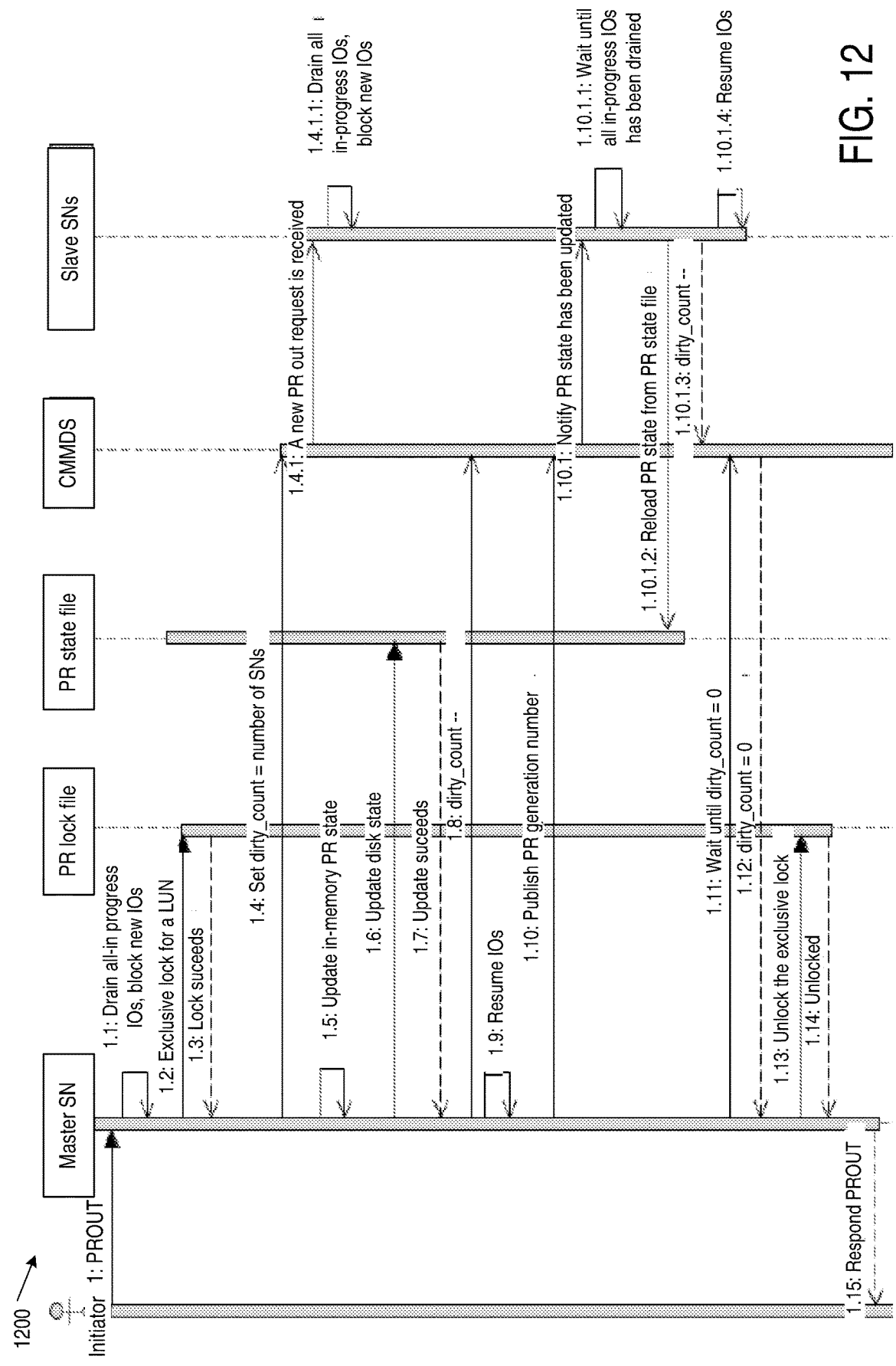
FIG. 12 is a block diagram illustrating a method for the system of FIG. 2 to process PR requests in some examples of the present disclosure.

FIG. 12 is a block diagram illustrating a method 1200 for system 200 to process PR requests in some examples of the present disclosure. FIG. 12 demonstrates a host 202 process a PR request and coordinating with the other hosts 202 to update their PR state according. To demonstrate method 1200, a SN for a target that receives a PR request is hereafter referred to as "master SN," and other SNs for the target are hereafter referred to as "slave SNs." A master SN is responsible for processing the PR request and coordinate all SNs for the target. Method 1200 may begin in step 1.

In step 1, initiator 406 sends a PROUT request for a given LUN 602 to a SN for a target 502 containing the LUN 602. In step 1.1, the SN is the first to receive the PROUT request among all the SNs for target 502 and becomes the master SN immediately. The master SN drains all the in-progress I/Os to LUN 602 and blocks all new I/Os to LUN 602.

In step 1.2, the master SN attempts to acquire the exclusive lock on the PR lock file for LUN 602. A PR lock file 812 (FIG. 8) is created for each LUN 602 in the target namespace object to synchronize PR processing. PR lock file 812 provides a mechanism to ensures only one SN processes a PROUT request for a LUN within the whole vSAN cluster 216 so only the SN that gains the exclusive lock on the PR lock file for a LUN may update the PR state of the LUN in a PR state file 814 (FIG. 8) shared among hosts 202 in vSAN cluster 216.

Assume in step 1.3, the master SN acquires excusive lock on the PR lock file for LUN 602. In step 1.4, the master SN publishes a parameter called "dirty_count," which indicates the copies of the PR state in the SNs that have not been modified, to CMMDS cluster directory 604 to notify the slave SNs of the PROUT request. The master SN sets the dirty_count equal to the total number of SNs for target 502. In step 1.4.1, CMMDS 302 of the master node pushes the dirty_count to the slave SNs. In step 1.4.2, the slave SNs start draining all the in-progress I/Os and block any new I/Os. In this phase, the master SN does not need to wait for the slave SNs to finish draining their in-progress I/Os before proceeding to step 1.5.

In step 1.5, the master SN updates the PR state of LUN 602 in its volatile memory. In step 1.6, the master SN updates the PR state of LUN 602 in the PR state file 814. The PR state may include a registered key and a reservation. In step 1.7, the master SN receives acknowledgement that the PR state in the PR state file has been successfully updated.

In step 1.8, the master SN decrements the dirty_count in CMMDS cluster directory 604. In step 1.9, the master SN resumes I/Os. In step. 1.10, the master SN increments a "PR generation number" and publishes it to CMMDS cluster directory 604 to indicate the PR state has changed. In step 1.10.1, CMMDS 302 of the master node pushes the incremented configuration generation number to the slave SNs.

In step 1.10.1.1, the slave SNs wait for all the in-progress I/Os to be drained. In step 1.10.1.2, the slave SNs reload the PR state from the PR state file to their volatile memories. In step 1.10.1.3, each slave SN decrements dirty_count in CMMDS cluster directory 604 by one to indicate it has received the latest the PR state. CMMDS ensures that each slave SN updates dirty_count atomically when multiple SNs try to update the parameter simultaneously. In step 1.10.1.4, the slave SNs resume their I/O processing.

In step 1.11, the master SN waits for the dirty_count to reach zero (0) in CMMDS cluster directory 604, which indicates all the SNs for target 502 have received the latest PR state. In step 1.12, the master SN detects the dirty_count reached zero (0). In step 1.13, the master SN releases the exclusive lock on the PR lock file for LUN 602. In step 1.14, the master SN receives acknowledgment that the PR lock file has been unlocked. In step 1.15, the master SN responds to the PROUT request to indicate to initiator 406 that the PR state of LUN 602 has been successfully updated at all the SNs for target 502.

iSCSI supports ordered command delivery from an initiator to a target in a session. VIT service leverages this mechanism for SNs to drain and resume I/Os in method 1100.

If a slave SN fails to reload the latest PR state for a LUN, the slave SN must fence off all I/Os until it successfully reloads the PR state. Therefore, the master SN defines a timeout for all slave SNs to finish reloading the PR state. When a SN reloads PR state after failover, it would not decrease the dirty_count. When the master node detects the dirty_count failed to reach zero (0) within the timeout, the master SN assumes one or more slave SNs died and proceeds to steps 1.13, 1.14, and 1.15 as usual.

In the case of network partition, the minority node is not able to contact a component owner so its I/O is fenced off.

As PR requests may be processed by multiple SNs simultaneously, tracking SCSI unit attentions is a challenge as well. Thus, PR state file 814 is extended to persist unit attentions. This enables the slave SNs to read and hand out unit attentions. For example, when a PREEMPT request is received, all the paths are notified to read the unit attention other than the one where the PREEMPT request is issued.

All the host has the latest SCSI-3 PR state in local volatile memory, they can check whether an I/O is allowed by checking its in-memory PR state.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method for a hyper-converged, distributed storage system including a cluster of host computers to implement an active-active architecture for providing Internet Small Computer System Interface (iSCSI) target service, the method comprising:

receiving, by a first host computer in the cluster of host computers, parameters for an iSCSI target and one or more logical unit numbers (LUNs) in the iSCSI target;

creating, by the first host computer, components of the iSCSI target and placing the components on different component owners selected from the cluster of host computers;

providing, by the first host computer, other host computers in the cluster of host computers with information about the iSCSI target, the one or more LUNs, and the components owners of the iSCSI target; and concurrently performing, by the first host computer with at least one of the different component owners that is active, the iSCSI I/Os with the iSCSI target.

2. The method of claim 1, further comprising, when a storage node for the iSCSI target has failed and a second host computer in the cluster of host computers is a component owner of the iSCSI target, the second host computer is configured to perform:

becoming a new storage node for the iSCSI target;

becoming a new discovery node that processes iSCSI discovery for the iSCSI target; and while the new storage code is active, performing the iSCSI I/Os with the iSCSI target concurrently with one or more other storage nodes of the iSCSI target.

3. The method of claim 1, further comprising:

a discovery node in the cluster of host computers receiving an iSCSI discovery command for the iSCSI target; and in response to receiving the iSCSI discovery command, the discovery node identifying all storage nodes of the iSCSI target.

4. The method of claim 1, further comprising:

a non-storage node of the iSCSI target receiving, from an iSCSI initiator, a login request for the iSCSI target; and in response to receiving the login request for the iSCSI target, the non-storage node redirecting the iSCSI initiator to a storage node of the iSCSI target.

5. The method of claim 1, further comprising:

a storage node of the iSCSI target receiving, from an iSCSI initiator, a login request for the iSCSI target; and in response to receiving the login request for the iSCSI target, the storage node of the iSCSI target redirecting the iSCSI initiator to another storage node of the iSCSI target.

6. The method of claim 1, further comprising, when a storage node of the iSCSI target receives a persistent reservation (PR) command to change a PR state of a LUN in the iSCSI target:

the storage node attempting to acquire an exclusive lock on the LUN;

in response to acquiring the exclusive lock on the LUN, the storage node updating the PR state of the LUN in a PR state file shared by the cluster of host computers; and after the storage node updates the PR state of the LUN in the PR state file and after all other storage nodes of the iSCSI target reload the PR state of the LUN from the PR state file, the storage node responding to the PR command.

7. The method of claim 6, further comprising:

the storage node draining its in-progress I/Os for the LUN and blocking any new I/Os for the LUN prior to attempting to acquire the exclusive lock on the PR lock file;

the storage node publishing a dirty count parameter to all the storage nodes of the iSCSI target;

after updating the PR state of the LUN in the PR state file, the storage node decrementing the dirty count parameter, republishing the dirty count to all the storage nodes of the iSCSI target, and publishing a PR generation number to all the storage nodes of the iSCSI target, the PR generation number indicating the PR state of the LUN has changed; and after determining the dirty count parameter is zero and prior to responding to the PR command, the storage node releasing the exclusive lock on the PR lock file.

8. A non-transitory computer-readable storage medium encoded with instructions providing Internet Small Computer System Interface (iSCSI) target service which, in response to execution by a first host computer in a cluster of host computers, cause the first host computer to:

receive parameters for an iSCSI target and one or more logical unit numbers (LUNs) in the iSCSI target;

create components of the iSCSI target and placing the components on different component owners selected from the cluster of host computers;

provide to other host computers in the cluster of host computers with information about the iSCSI target, the one or more LUNs, and the components owners of the iSCSI target; and concurrently perform with at least one of the different component owners that is active, the iSCSI I/Os with the iSCSI target.

9. The non-transitory computer-readable storage medium of claim 8, further comprising instructions which, in response to execution by a second host computer in the cluster of host computers when a storage node for the iSCSI target has failed and the second host computer is a component owner of the iSCSI target, cause the second host computer to:

become a new storage node for the iSCSI target;

become a new discovery node that processes iSCSI discovery for the iSCSI target; and while the new storage code is active, perform the iSCSI I/Os with the iSCSI target concurrently with one or more other storage nodes of the iSCSI target.

10. The non-transitory computer-readable storage medium of claim 8, further comprising instructions which, in response to execution by a discovery node in the cluster of host computers, cause the discovery node to:

receive an iSCSI discovery command for the iSCSI target; and in response to receiving the iSCSI discovery command, identify all storage nodes of the iSCSI target.

11. The non-transitory computer-readable storage medium of claim 8, further comprising instructions which, in response to execution by a non-storage node of the ISCSI target, cause the non-storage node to:

receive from an iSCSI initiator a login request for the iSCSI target; and in response to receiving the login request for the iSCSI target, redirect the iSCSI initiator to a storage node of the iSCSI target.

12. The non-transitory computer-readable storage medium of claim 8, further comprising instructions which, in response to execution by a storage node of the iSCSI target, cause the storage node to:

receive from the iSCSI initiator the login request for the iSCSI target; and in response to receiving the login request for the iSCSI target, redirect the iSCSI initiator to another storage node of the iSCSI target.

13. The non-transitory computer-readable storage medium of claim 8, further comprising instructions which, in response to execution by a storage node of the iSCSI target when the storage node receives a persistent reservation (PR) command to change a PR state of a LUN in the iSCSI target, cause the storage node to:
   attempt to acquire an exclusive lock on the LUN;
   in response to acquiring the exclusive lock on the LUN, update the PR state of the LUN in a PR state file shared by the cluster of host computers; and
   after updating the PR state of the LUN in the PR state file and after all other storage nodes of the iSCSI target reload the PR state of the LUN from the PR state file, respond to the PR command.

14. The non-transitory computer-readable storage medium of claim 13, further comprising instructions which, in response to execution by the storage node, cause the storage node to:
   drain its in-progress I/Os for the LUN and blocking any new I/Os for the LUN prior to attempting to acquire the exclusive lock on the PR lock file;
   publish a dirty count parameter to all the storage nodes of the iSCSI target;
   after updating the PR state of the LUN in the PR state file:
      decrement the dirty count parameter;
      republishing the dirty count to all the storage nodes of the iSCSI target; and
      publish a PR generation number to all the storage nodes of the iSCSI target, the PR generation number indicating the PR state of the LUN has changed; and
   after determining the dirty count parameter is zero and prior to responding to the PR command, release the exclusive lock on the PR lock file.

15. A hyper-converged, distributed storage system configured to support an active-active architecture for providing Internet Small Computer System Interface (iSCSI) target service, comprising:
   a cluster of host computers, each including a hypervisor, wherein a first host computer in the cluster of host computers is configured to:
      receive parameters for an iSCSI target and one or more logical unit numbers (LUNs) in the iSCSI target;
      create components of the iSCSI target and place the components on different component owners selected from the cluster of host computers, wherein each of the different component owners corresponds to a storage node for the iSCSI target;
      create each LUN from storage distributed across the cluster of host computers;
      provide other host computers in the cluster of host computers with information about the iSCSI target, the one or more LUNs, and the components owners of the iSCSI target; and
      concurrently perform, with at least one of the different component owners that is active, the iSCSI I/Os with the iSCSI target.

16. The system of claim 15, wherein, when a storage node for the iSCSI target has failed and a second host computer in the cluster of host computers is a component owner of the iSCSI target, the second host computer is configured to:
   become a new storage node for the iSCSI target;
   become a new discovery node that processes iSCSI discovery for the iSCSI target; and
   while the new storage code is active, perform the iSCSI I/Os with the iSCSI target concurrently with one or more other storage nodes of the iSCSI target.

17. The system of claim 15, wherein:
   each host computer in the cluster of host computers is configured to become a discover node that receives an iSCSI discovery command for the iSCSI target; and
   in response to receiving the iSCSI discovery command, the discovery node is configured to identify all storage nodes of the iSCSI target.

18. The system of claim 15, wherein:
   a non-storage node of the iSCSI target is configured to receive, from an iSCSI initiator, a login request for the iSCSI target; and
   in response to receiving the login request for the iSCSI target, the non-storage node is configured to redirect the iSCSI initiator to a storage node of the iSCSI target.

19. The system of claim 15, wherein:
   a storage node of the iSCSI target is configured to receive, from the iSCSI initiator, the login request for the iSCSI target; and
   in response to receiving the login request for the iSCSI target, the storage node of the iSCSI target is configured to redirect the iSCSI initiator to another storage node of the iSCSI target.

20. The system of claim 15, wherein, when a storage node of the iSCSI target receives a persistent reservation (PR) command to change a PR state of a LUN in the iSCSI target:
   the storage node is configured to attempt to acquire an exclusive lock on the LUN;
   in response to acquiring the exclusive lock on the LUN, the storage node is configured to update the PR state of the LUN in a PR state file shared by the cluster of host computers; and
   after the storage node updates the PR state of the LUN in the PR state file and after all other storage nodes of the iSCSI target reload the PR state of the LUN from the PR state file, the storage node is configured to respond to the PR command.

21. The system of claim 20, wherein the storage note is configured to:
   drain its in-progress I/Os for the LUN and blocking any new I/Os for the LUN prior to attempting to acquire the exclusive lock on the PR lock file;
   publish a dirty count parameter to all the storage nodes of the iSCSI target;
   after updating the PR state of the LUN in the PR state file, decrement the dirty count parameter, republish the dirty count to all the storage nodes of the iSCSI target, and publish a PR generation number to all the storage nodes of the iSCSI target, the PR generation number indicating the PR state of the LUN has changed; and
   after determining the dirty count parameter is zero and prior to responding to the PR command, release the exclusive lock on the PR lock file.

* * * * *